United States Patent [19]

Jubinski

[11] Patent Number: 4,692,907
[45] Date of Patent: Sep. 8, 1987

[54] MEANS FOR MAINTAINING A FIXED RELATIVE ORIENTATION OF TWO SENSORS

[75] Inventor: Paul Jubinski, Houston, Tex.

[73] Assignee: Western Geophysical Company of America, Houston, Tex.

[21] Appl. No.: 911,718

[22] Filed: Sep. 26, 1986

Related U.S. Application Data

[63] Continuation of Ser. No. 679,813, Dec. 10, 1984, abandoned.

[51] Int. Cl.4 ............... G01V 1/18; H01K 17/00
[52] U.S. Cl. ..................... 367/20; 367/153; 367/178; 181/112
[58] Field of Search ............ 367/153, 178, 20; 181/112

[56] References Cited

U.S. PATENT DOCUMENTS 3,749,948 7/1973 Morais ................... 367/166
4,334,296 6/1982 Hall ...................... 367/166

Primary Examiner—Nelson Moskowitz
Attorney, Agent, or Firm—William A. Knox; E. Eugene Thigpen

[57] ABSTRACT

A gradiometer array of two or more sensors consists of a closed housing filled with a volume of fluid having a desired specific gravity. The sensors are freely suspended in the housing by flexible tethers. The sensors have different specific gravities such that one always sinks and the other floats. By that means, the sensors are self-aligning along an axis parallel to the gravitational vertical.

11 Claims, 5 Drawing Figures

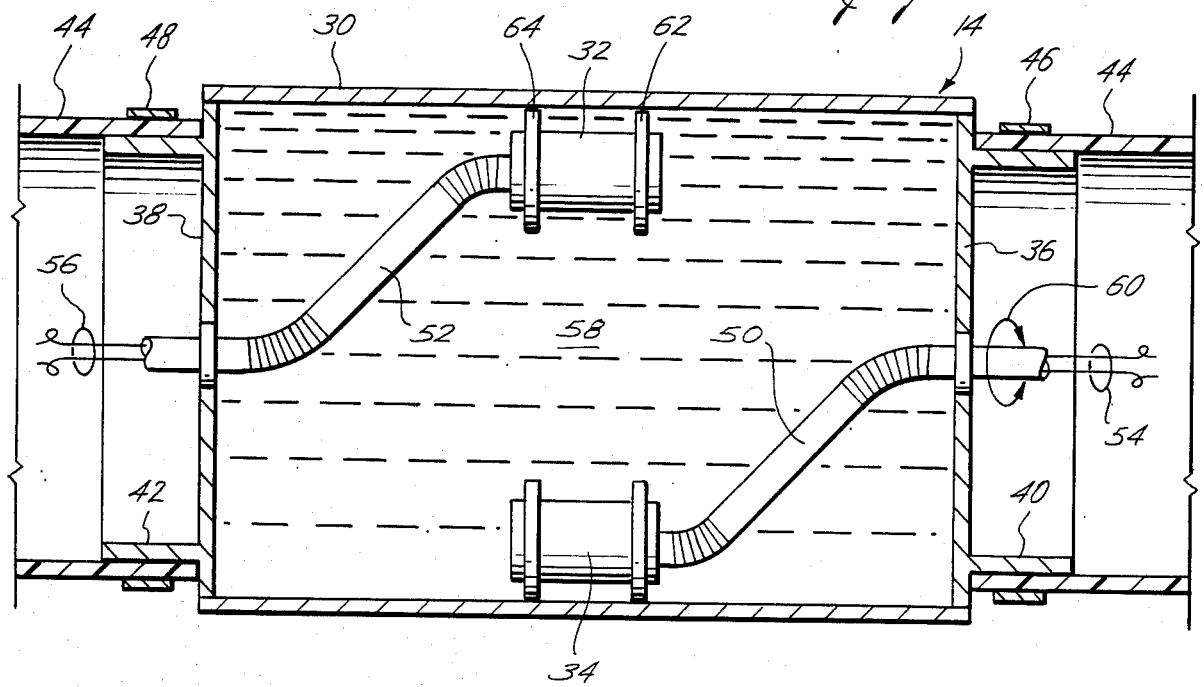
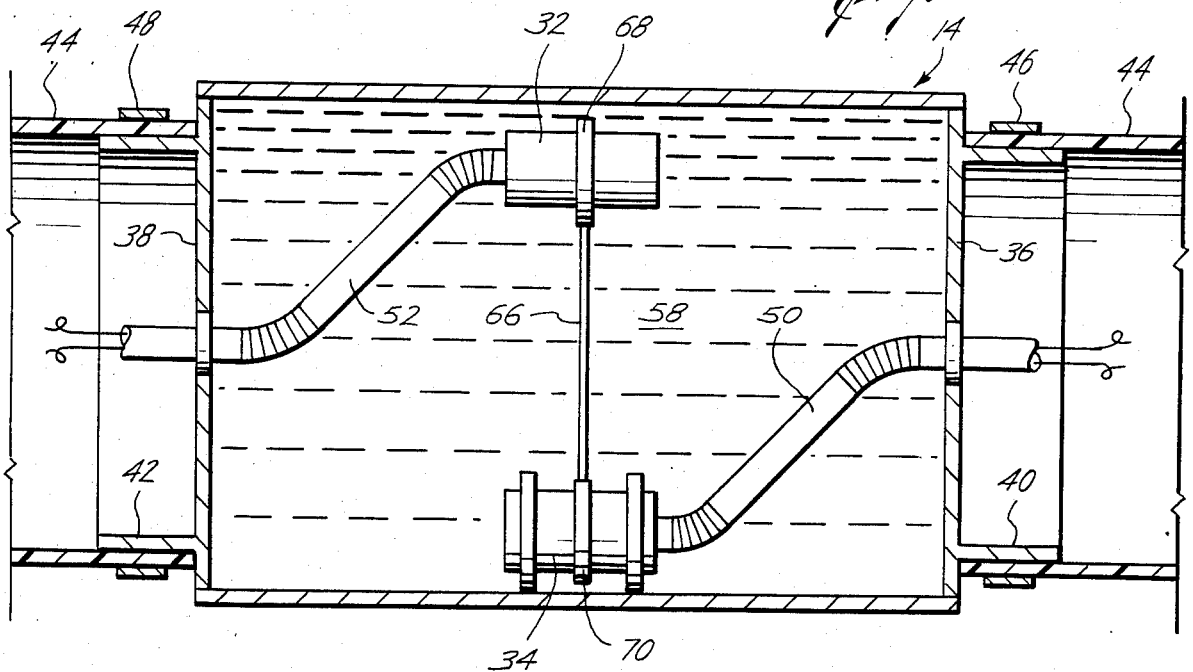

MEANS FOR MAINTAINING A FIXED RELATIVE ORIENTATION OF TWO SENSORS

This application is a continuation of application Ser. No. 679,813, filed Dec. 10, 1984, now abandoned.

BACKGROUND OF THE INVENTION

1. Field of the Invention

This invention provides a means for assuring a desired relative orientation of two or more sensors with respect to the gravitational vertical regardless of the rotational orientation of the housing in which the sensors are contained.

2. Discussion of the Prior Art

A sensor array intended for measurement of the gradient of a potential field such as the gravitational field, magnetic or electric field, or a pressure field as in seismic exploration, must assume some sort of identifiable orientation with respect to that field. For example, in marine seismic exploration, it is required to know the direction of arrival of seismic pressure waves at seismic sensors due to reflections from subsurface earth layers or from the air-water interface.

In seismic operations at sea, an acoustic source generates a wavefield that radiates outwardly in all directions by spherical spreading. A plurality of horizontally spaced-apart pressure sensors, such as hydrophones, are mounted in a long tubular-jacketed streamer cable at assigned stations therein. The streamer cable is towed in a substantially horizontal plane, at a selected depth, by a mother ship. The pressure sensors themselves are generally non-directional listening devices. If the seismic-wave propagation direction is of importance, then more than one sensor is required at each sensor station. Preferably at least two sensors disposed one above the other, are needed at every sensor station. If the orientation of the sensors with respect to the vertical is known accurately, the direction of acoustic-wave propagation can be determined.

One method has been proposed wherein two separate streamer cables are towed from the same ship, separated vertically from one another by several feet. Seismic streamer cables are very expensive, on the order of several hundred thousand dollars. Therefore such a method is decidedly uneconomical. It is furthermore very difficult, if not impossible, to tow two streamers, several kilometers in length, so that they remain in a vertical plane and at a known separation over their entire length.

In another suggested method, a pair of sensors are fixedly mounted at each horizontally spaced-apart station inside the streamer cable jacket but on opposite sides of the jacket inner wall. Unfortunately, a seismic streamer cable twists and turns about its longitudinal axis when under tow so that the configuration of the sensor pair, relative to the vertical is never known.

It is well known that the sensors could be gimbal-mounted and balanced so that each sensor pair would always be vertical. But it has been found that gimbal mounting is too bulky and is too delicate to stand up under field conditions. Additional problems arise in connection with the slip rings and brushes that are needed to pick off the electrical seismic sensor signals.

SUMMARY OF THE INVENTION

It is the purpose of this invention to provide a gradiometer array including means for maintaining a set or array of at least two cooperating sensors in a preselected configuration with respect to each other and with respect to a preferred gravitational axis. In one configuration, the preferred axis is vertical.

In accordance with an aspect of this invention, I provide a housing which may be cylindrical or other desired shape. The housing is closed at each end by end closures. The housing is filled with a fluid having a preselected specific gravity. The cooperating sensors are freely suspended within the housing. A sensor may be secured to each end closure by a flexible tether. The precise shapes of the sensor packages is immaterial except that they should be capable of smoothly rolling around the inner surface of the housing. They may be enclosed in a fluid-tight subenclosure if desired. One of the sensors is ballasted to a specific gravity less than the fluid contained in the housing. The other is ballasted to a greater specific gravity. Accordingly the lighter of the two sensors will always float above the heavier of the two.

In accordance with another aspect of this invention, the sensors are provided with peripheral rollers to minimize friction when the sensors reposition themselves within the housing when the housing rotates.

In another aspect of this invention electrical signal-conducting leads are incorporated into the flexible tethers to provide signal communication between the enclosed sensors and the outside world.

In accordance with yet another aspect of this invention, the housing is substantially spherical so that the sensors can reposition themselves in the face of random housing orientations.

In accordance with a further aspect of this invention the specific gravity of the volume of liquid within the housing is an average of the specific gravities of the respective sensors.

BRIEF DESCRIPTION OF THE DRAWINGS

A better understanding of the benefits and advantages of my invention may be obtained from the appended detailed description and the drawings, wherein:

FIG. 2 illustrates in cross-section two sensors secured to flexible tethers, mounted inside a fluid-filled housing;

FIG. 3 is an alternate design wherein the sensors are rotatably mounted at the ends of a mechanical linkage;

DETAILED DESCRIPTION OF THE PREFERRED EMBODIMENT

The invention now to be disclosed in detail is a potential-field gradiometer array wherein at least two sensors are disposed in a fixed relation to one another as measured with respect to the gravitational vertical. That is, the gradiometer array is self orienting and is cntained within a module or housing. The sensors may be of any desired type and may be deployed in any desired environment. For purposes of example however, but not by way of limitation, the invention will be explained in terms of seismic pressure-field sensors employed in a marine environment.

Figure 1:
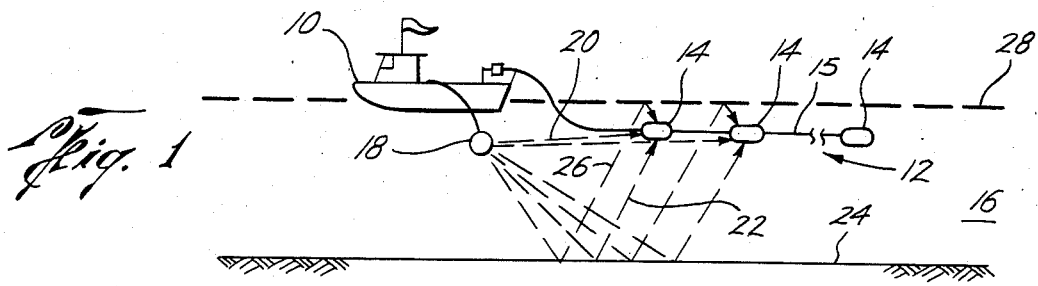
FIG. 1 shows a mother ship towing a seismic streamer cable through a body of water.

Referring now to FIG. 1, there is shown a ship 10 towing a sectionalized streamer cable 12, that includes a plurality of sensor modules 14 plus connecting cable sections 15, through a body of water 16. Each module is coupled electrically and mechanically between adjacent streamer-cable sections. At intervals, a sound source 18 generates an acoustic wavefield. The wavefront ray paths propagate outwardly. Some of the ray paths such as 20 arrive directly from source 18. Other ray paths such as 22 are reflected from the sea floor 24 and arrive at the sensors from below. Still other ray paths such as 26 are reflected once from sea floor 24 and a second time from sea surface 28 thereby arriving from above. From wavefront arrival times, the pressure gradient vector may be determined by well-known methods.

In FIG. 2, there is shown a longitudinal cross-sectional view of a sensor or gradiometer module 14. Sensor module 14 includes an elongated housing 30 of any desired shape or size but preferably cylindrical and of dimensions commensurate with the dimensions of the sensors 32 and 34 of which there may be two or more. Housing 30 is closed at each end by end closures 36 and 38. If the sensor module 14 is to be used with a seismic streamer cable, end closures 36 and 38 may include an external boss such as 40 and 42 to which a streamer cable jacket 44 may be secured at by steel bands 46 and 48. For simplicity, some of those latter details are not repeated in the remaining drawings.

A plurality of sensors such as 32 and 34 are freely suspended from end closures 36 and 38 by flexible tethers 50 and 52 which include signal transmission leads 54 and 56, which may be wires, coaxial cables, optical fibers or the like, for conducting sensor signals to the outside world. The cooperating sensors such as 32 and 34 constitute a gradiometer array. Housing 30 is filled with a fluid 58 having a desired specific gravity such as light kerosene (s.g.=0.760), water (s.g.=1.00) or any other suitable fluid. One sensor such as 32 is ballasted to a specific gravity less than fluid 58; the other sensor such as 34 is heavily ballasted to a substantially greater specific gravity so that it will sink relative to sensor 32. The buoyancy of the lighter sensor 32 must, of course, be sufficient to float both itself and the weight of its tether. If the tethers are less dense than fluid 58 the negative buoyancy of the heavy sensor 34 must be great enough to compensate for the buoyany of its tether. In a preferred embodiment, the specific gravity of the fluid might be selected to be an average of the specific gravities of the two sensors. When housing 30 and its attachments are rotated about a longitudinal axis as shown by arrow 60, one of the sensors will always float and the other will always sink, thereby maintaining their fixed relationship with respect to each other and along an axis parallel to the gravitational vertical. Because both tethers 50 and 52 as well as sensors 32 and 34 are free to rotate when housing 30 is rotated about its longitudinal axis, the tethers will never become tangled or kinked. If desired, rotatable bearing rings such as 62 and 64 on sensor 32 (and similarly for sensor 34) may be installed. Since sensor 32 always rises against the top inner wall of housing 30 and sensor 34 always sinks to the bottom, the separation of the sensors is fixed and is equal to the inner dimensions of the housing.

FIG. 3 illustrates, in longitudinal cross section, an alternate embodiment wherein the two sensors 32 and 34 are coupled by a mechanical link 66. The sensors 32 and 34 are rotatably supported by bearings 68 and 70. Because the lightly-ballasted sensor 32 does not necessarily contact housing 30, bearing rings 62 and 64 are not needed.

Figure 4:
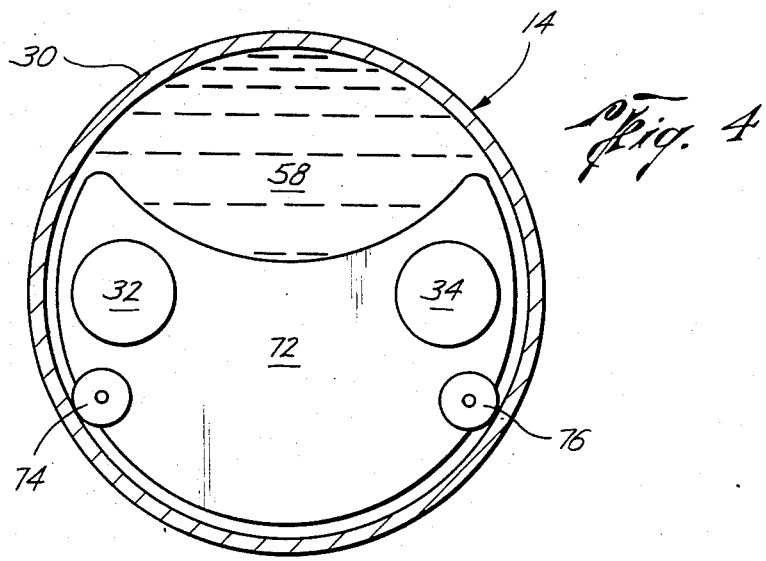
FIG. 4 is an end view of an arrangement wherein the two sensors maintain a horizontal configuration.

FIG. 4 is a transverse cross section of a module 14 wherein the sensors 32 and 34 are supported in a horizontal configuration. The sensors 32 and 34 are rotatably mounted in a sector 72. Sector 72 may ride on bearings such as 74 and 76 to permit free rotation inside housing 30. The weight of sector 72 causes it to remain at the lowest part of module 14 regardless of rotation of housing 30 about its longitudinal axis. Sensors 32 and 34 are, in this configuration, equally ballasted. Thus, there is provided a means for aligning sensors 32 and 34 along an axis that is substantially perpendicular to the gravitational vertical.

Figure 5:
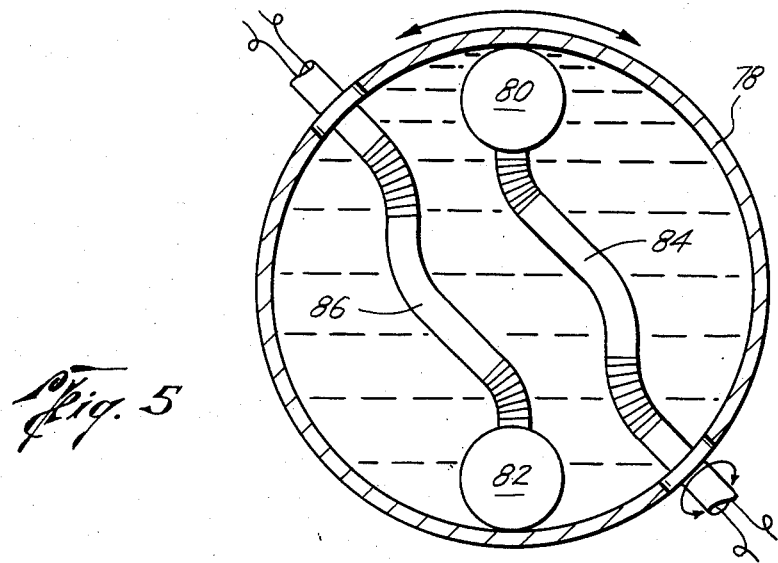
FIG. 5 is an alternate arrangement with the sensors mounted within a substantially spherical housing.

FIG. 5 illustrates in cross section use of a spherical housing 78 with the sensors enclosed in spherical packages or subhousings as at 80 and 82 secured by flexible tethers 84 and 86. Housing 78, as before, is filled with a suitable fluid 58. Use of a spherical module permits proper configuration of the sensors in the face of random housing-orientations.

For illustrative purposes, my invention has been described with a certain degree of specificity. Variations will occur to those skilled in the art but which may be included within the scope and spirit of this invention which is limited only by the appended claims.

I claim as my invention:

1. A sensor module comprising:
   an enclosed housing containing a fluid, said fluid having a selected specific gravity;
   a first and a second sensor, said sensors having ballasting means attached thereto, and said sensors and said ballasting means being positioned in said fluid and the specific gravity of said ballasting means being selected so as to enable said first sensor to retain a selected orientation with respect to said second sensor in reference to the vertical gravitational axis as the orientation of said housing changes; and
   means for coupling the signals sensed by said sensors to the exterior of said housing.

2. The apparatus of claim 1 wherein said first and second sensors are attached to separate ballasting means and said first sensor and its associated ballasting means have a specific gravity less than the specific gravity of said fluid and said second sensor and its associated ballasting means have a specific gravity greater than the specific gravity of said fluid whereby said first sensor maintains an upward vertical displacement relative to said second sensor as the orientation of said housing changes.

3. The apparatus of claim 2 further comprising a mechanical link for coupling said sensors.

4. The apparatus of claim 1 wherein said ballasting means comprises a mounting means having a specific gravity distribution which maintains substantially a selected orientation of said mounting means with respect to the gravitational vertical as the orientation of said housing changes, and wherein said sensors are selectively mounted on said mounting means, whereby said sensors maintain a selected orientation as the orientation of said housing changes.

5. The apparatus of claim 4 wherein said sensors are selectively mounted so that said first sensor maintains a substantially vertical displacement with respect to said second sensor as the orientation of said housing changes.

6. The apparatus of claim 4 wherein said sensors are selectively mounted so that said first sensor maintains a substantially horizontal displacement with respect to said second sensor as the orientation of said housing changes.

7. The apparatus of claim 2 further comprising flexible tethers for securing said two sensors to opposite sides of said housing, said flexible tethers including electrical conductors for transmitting electrical signals from said sensors.

8. The apparatus of claim 7 wherein said housing comprises a portion of a seismic streamer cable and said housing is an elongated housing having end closures and said flexible tethers secure said sensors to either end closure thereof and further comprising means external to said end closures for coupling said housing electrically and mechanically to adjacent streamer cable sections.

9. The apparatus of claim 1 wherein said sensors are pressure sensorsc

10. The apparatus of claim 1 wherein said housing is spherical and said sensors are encased in spherical packages so that said sensors will remain in a preferred orientation as the orientation of said housing changes.

11. A sensor module adapted for use in a seismic cable comprising:
   an enclosed housing;
   a volume of fluid within said housing;
   a first sensor unit having a specific gravity less than the specific gravity of said fluid and deployed within said housing so that said first sensor unit floats at the top of said fluid as the orientation of said housing changes;
   a second sensor unit having a specific gravity greater than the specific gravity of said fluid and deployed within said housing so that said second sensor unit remains at the bottom of said fluid as the orientation of said housing changes;
   a first and second flexible tether securing said first and second sensor units, respectively, to opposite ends of said housing, said tethers including signal conductors for coupling signal from said sensor units to the exterior of said housing.

* * * * *